(12) United States Patent
Liu (10) Patent No.: US 11,751,096 B2
(45) Date of Patent: Sep. 5, 2023

(54) CONGESTION CONTROL METHOD AND DEVICE, AND BASE STATION (71) Applicant: ZTE CORPORATION, Shenzhen (CN)

(72) Inventor: Zhuang Liu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 111 days.

(21) Appl. No.: 16/347,802

(22) PCT Filed: Nov. 2, 2017

(86) PCT No.: PCT/CN2017/109056
§ 371 (c)(1),
(2) Date: May 6, 2019

(87) PCT Pub. No.: WO2018/082597
PCT Pub. Date: May 11, 2018

(65) Prior Publication Data
US 2019/0297527 A1  Sep. 26, 2019

(30) Foreign Application Priority Data
Nov. 7, 2016 (CN) .......................... 201610988394.5

(51) Int. Cl.
*H04W 28/02* (2009.01)
*H04L 47/11* (2022.01)
(Continued)

(52) U.S. Cl.
CPC .......... *H04W 28/0289* (2013.01); *H04L 47/11* (2013.01); *H04L 47/12* (2013.01);
(Continued)

(58) Field of Classification Search
CPC ............. H04W 28/0289; H04W 28/08; H04W 28/0231; H04W 28/0247; H04W 28/10;
(Continued)

(56) References Cited

U.S. PATENT DOCUMENTS

2002/0167955 A1  11/2002  Shimojo
2004/0052212 A1*  3/2004  Baillargeon ............ H04L 47/12
370/235
(Continued)

FOREIGN PATENT DOCUMENTS

CN  1713633 A  12/2005
CN  101267382 A  9/2008
(Continued)

OTHER PUBLICATIONS

International Search Report dated Jan. 29, 2018 for International Application No. PCT/CN2017/109056, 5 pages.
(Continued)

*Primary Examiner* — Scott M Sciacca
*Assistant Examiner* — Mon Cheri S Davenport
(74) *Attorney, Agent, or Firm* — Knobbe, Martens, Olson & Bear, LLP (57) ABSTRACT

Provided are a congestion control method and device, and a base station. The congestion control method includes: determining whether a traffic data flow transmitted by a base station is congested; setting an Internet protocol (IP) data packet in the traffic data flow when the traffic data flow transmitted by the base station is congested, where the set IP data packet is used for indicating that the traffic data flow transmitted by the base station is congested. The present disclosure solves the problem in the existing art that user throughput is affected because a base station only determines whether the base station is congested.

16 Claims, 6 Drawing Sheets (51) Int. Cl.
*H04L 47/12* (2022.01)
*H04W 28/10* (2009.01)

(52) U.S. Cl.
CPC ....... *H04W 28/02* (2013.01); *H04W 28/0268* (2013.01); *H04W 28/10* (2013.01)

(58) Field of Classification Search
CPC ............ H04W 28/02; H04W 28/0268; H04W 28/0278; H04L 47/14; H04L 47/12; H04L 2012/5635; H04L 2012/5636; H04L 2012/5682; H04L 47/11; H04L 47/125; H04L 47/2441
See application file for complete search history.

(56) References Cited

U.S. PATENT DOCUMENTS

| | | | |
|---|---|---|---|
| 2010/0020689 A1* | 1/2010 | Tang | H04L 69/16 370/235 |
| 2011/0032935 A1* | 2/2011 | Yang | H04W 8/04 370/389 |
| 2011/0222406 A1* | 9/2011 | Persson | H04L 47/29 370/236 |
| 2012/0087244 A1 | 4/2012 | Leung | |
| 2012/0087245 A1 | 4/2012 | Leung | |
| 2012/0147750 A1* | 6/2012 | Pelletier | H04L 47/12 370/235 |
| 2012/0307634 A1 | 12/2012 | Zhu | |
| 2013/0021916 A1 | 1/2013 | Zhou et al. | |
| 2013/0194937 A1 | 8/2013 | Sridhar et al. | |
| 2014/0056128 A1* | 2/2014 | Racz | H04W 8/04 370/229 |

FOREIGN PATENT DOCUMENTS

| | | |
|---|---|---|
| CN | 101577938 A | 11/2009 |
| CN | 101646196 A | 2/2010 |
| CN | 101765145 A | 6/2010 |
| CN | 101997644 | 3/2011 |
| CN | 102158896 | 8/2011 |
| CN | 102223663 | 10/2011 |
| CN | 102281183 A | 12/2011 |
| CN | 102484819 A | 5/2012 |
| CN | 102868671 A | 1/2013 |
| CN | 103888846 A | 6/2014 |
| CN | 104125607 A | 10/2014 |
| EP | 2068511 A1 | 6/2009 |
| JP | H 10322392 A | 12/1998 |
| JP | 2005102104 A | 4/2005 |
| WO | WO 2012048026 | 4/2012 |
| WO | WO 2013116255 | 8/2013 |

OTHER PUBLICATIONS

Written Opinion of the International Searching Authority dated Jan. 29, 2018 for International Application No. PCT/CN2017/109056, 3 pages.
"R3-041502_E-DCH_Iub_congestion": 3 3GPP, Shin-Yokohama, Japan, Nov. 15-19, 2004.
"S2-130895_Leverage SCI for RAN User Plan congestion mitigation-V2 O": 3 3GPP, San Diego, USA, Apr. 8-12, 2013.
First Search Report for Chinese Application No. 2016109883945 dated Apr. 18, 2022.
First Office Action for Chinese Application No. 201610988394.5 dated Apr. 24, 2022.

* cited by examiner

CONGESTION CONTROL METHOD AND DEVICE, AND BASE STATION

This application is a US national phase application of international patent application No. PCT/CN2017/109056 filed on Nov. 2, 2017, which claims priority to Chinese patent application No. 201610988394.5, entitled "Congestion Control Method And Device, And Base Station" and filed on Nov. 7, 2016, the disclosures of each of which are incorporated therein by reference in their entireties.

TECHNICAL FIELD

The present disclosure relates to the field of wireless communications and, for example, to a congestion control method and device, and a base station.

BACKGROUND

The traditional Transmission Control Protocol (TCP) belongs to implicit congestion control. According to the implicit congestion control, only when a repeated acknowledgement (ACK) or retransmission timeout is detected, will the occurrence of congestion be considered. It takes a long time to find link congestion in this mechanism, reducing congestion control efficiency. To improve the situation, the Internet Engineering Task Force (IETF) defines an explicit congestion notification (ECN), which is an explicit congestion control mechanism. When a TCP link is established, ECN negotiation can be performed. If the negotiation is successfully performed, when an intermediate node of the transmission link detects that the intermediate node itself is congested, the intermediate node needs to modify an ECN bit, ECN=01 or ECN=10 (ECN=01/10 indicates that the ECN is supported in the successful negotiation and ECN=00 indicates that the ECN is not supported), at the Internet Protocol (IP) header of an IP data packet transmitted by the node itself to ECN=11, indicating that congestion occurs on the transmission path. When a receiving end of the TCP receives the IP data packet whose IP header is set to ECN=11, the receiving end knows that the congestion occurs on the transmission path and sets an ECE bit in the TCP header to 1 when a TCP ACK is returned to notify the transmitting end. The transmitting end of the TCP receives a TCP ACK message with the ECE bit set to 1, detects the congestion of the intermediate node in time, and can adopt a corresponding congestion control strategy to reduce the TCP transmission rate before the data packet is lost. The original ECN is mainly defined to support congestion control based on the TCP data flow. Subsequently, the IETF also formulates usage specifications of the ECN based on a User Datagram Protocol (UDP), which is mainly applied to adaptive coding rate adjustment of the Real-time Transport Protocol (RTP) of the UDP. For RTP traffic, when the intermediate node of the transmission link which supports the ECN in the successful negotiation detects that the node itself is congested, the intermediate node can modify the ECN bit at the header of the transmitted IP data packet to ECN=11 to indicate that the congestion occurs. When the receiving end receives the IP data packet with ECN=11, the receiving end can send a command to inform the transmitting end to enable the transmitting end to reduce the traffic coding rate.

The transport layer protocols based on the TCP and the UDP are also adopted in the wireless communication network. The ECN-based congestion control strategy on TCP and UDP data flows are also supported in the existing wireless communication standards developed by the Third Generation Partnership Projects (3GPP). For TCP traffic and UDP traffic in the wireless communication system, the 3GPP protocol stipulates that when a base station detects the congestion of the base station, the base station needs to modify the ECN=01 or ECN=10 (ECN=01/10 indicates that the ECH is supported in the successful negotiation and ECN=00 indicates that the ECN is not supported) of the IP data packet transmitted by the base station to ECN=11, indicating that the current base station is congested.

It can be seen from the above description that in the existing 3GPP ECN congestion control scheme, the ECN congestion bit is set in the IP data packet according to whether the whole base station is congested. However, the base station is different from nodes such as a router and a switch in the Internet. Because the router and the switch has no user traffic and can only identify and forward the IP data packet, those nodes such as the router and the switch all set the ECN congestion bit according to whether the whole transmission node is congested. The base station in the 3GPP network can identify different traffic flows of different users. These traffic flows have different Quality of Service (QoS) control levels, for example, different traffic may have different QoS characteristics such as a maximum allowed rate, a minimum allowed rate and a guaranteed bit rate (GBR). The system performs differentiated scheduling and transmission according to the QoS of the traffic. The base station can ensure that the GBR traffic is not affected and meanwhile reduce the rate of other traffic with a low priority in the case where transmission resources are limited (congested). In the existing 3GPP ECN scheme, the base station only sets the congestion bit of the transmitted IP message according to whether the whole base station is congested, which may easily cause the transmitting end to reduce the rate of the traffic that does not need rate reduction. Therefore, large defects of the scheme in which the existing base station sets the ECN congestion bit according to whether the whole base station is congested rather than the user traffic need to be improved.

In addition, the current 3GPP ECN congestion control scheme is only suitable for the case where a single base station is connected. In this case, the user traffic is transmitted through only one base station. In the evolution of wireless communications to LTE-A, 5G and the future wireless system, the multi-connection transmission technology will have increasingly wider applications to increase user rate and meet hotspot capacity and coverage requirements. In the multi-connection technology, one user can maintain connections with two or more base stations. In the case where a user's single traffic data is shunted to two or more base stations for transmission, since the user has multiple transmission paths for the traffic data, after a certain base station is congested, the traffic flow can be shunted to other base stations for transmission. Therefore, the congestion of a base station on a certain path cannot indicate that the user traffic is certainly congested. However, according to the existing 3GPP ECN scheme, when a certain base stations is congested, the base station will set a congestion indication, ECN=11, in the transmitted IP data packet and ignore that the traffic data can be shunted to other non-congested base stations, resulting in unnecessary rate reduction of the transmitting end. When the transmitting end reduces the rate, it takes a long time to recover to the original rate, which will seriously affect user throughput. In the evolution of the future communication system, it is predicted that the multi-connection technology will be widely used in the deployment of an ultra-dense cell. When a user is connected to more base stations, more transmission paths exist and a certain congested base station is more likely to trigger congestion control. Therefore, it is unreasonable that a single congested node triggers the congestion control and results in the rate reduction of the transmitting end so that the transmission rate of all the paths is reduced.

Therefore, considerable defects of the explicit ECN congestion control scheme in the existing 3GPP wireless communication network need to be improved.

No effective solution has yet been proposed for the preceding problem.

SUMMARY

A summary of the subject matter is described hereinafter in detail. This summary is not intended to limit the scope of the claims.

Embodiments of the present disclosure provide a congestion control method and device, and a base station to solve at least the problem in the existing art that user throughput is affected because a base station only determines whether the base station is congested.

An embodiment of the present disclosure provides a congestion control method. The method includes: determining whether a traffic data flow transmitted by base stations is congested; and setting an Internet Protocol (IP) data packet in the traffic data flow when the traffic data flow transmitted by the base stations is congested, where the set IP data packet is used for indicating that the traffic data flow transmitted by the base stations is congested.

An embodiment of the present disclosure provides a congestion control device. The device includes a determination module, configured to determine whether a traffic data flow transmitted by base stations is congested; and a setting module, configured to set an Internet Protocol (IP) data packet in the traffic data flow when the determination module determines that the traffic data flow transmitted by the base stations is congested, where the set IP data packet is used for indicating that the traffic data flow transmitted by the base stations is congested.

An embodiment of the present disclosure provides a base station. The base station includes: a first processor, configured to determine whether a traffic data flow transmitted by the base station is congested; and a second processor, configured to set an Internet Protocol (IP) data packet in the traffic data flow when the first processor determines that the traffic data flow transmitted by the base station is congested, where the set IP data packet is used for indicating that the traffic data flow transmitted by the base station is congested.

Another embodiment of the present disclosure provides a storage medium. The storage medium is configured to store program codes for executing the following steps: determining whether a traffic data flow transmitted by base stations is congested; setting an Internet protocol (IP) data packet in the traffic data flow in response to determining that the traffic data flow transmitted by the base stations is congested, where the set IP data packet is used for indicating that the traffic data flow transmitted by the base stations is congested.

Based on the embodiments of the present disclosure, it may be determined whether the traffic data flow carried by the base stations is congested and the IP data packet in the traffic data flow is set when the traffic data flow is determined to be congested to indicate that the traffic data flow is congested and thus different traffic data may be differentiated. Therefore, when a certain traffic data flow is congested and other traffic data flows are not congested, a transmitting end will not reduce a rate of a non-congested traffic data flow, thereby greatly reducing influence on the user throughput and solving the problem in the existing art that the user throughput is affected because the base station only determines whether the base station is congested.

Other aspects can be understood after the drawings and detailed description are read and understood.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
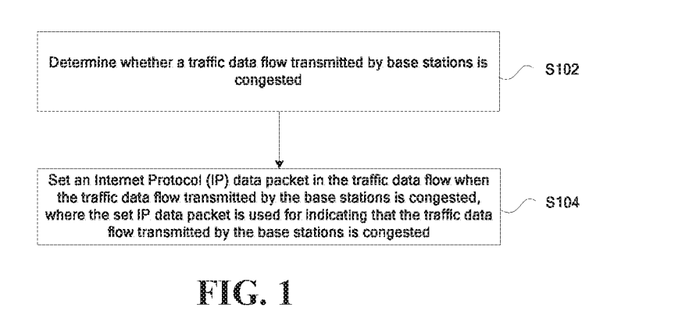
FIG. 1 is a flowchart of a congestion control method according to an embodiment of the present disclosure.

This embodiment provides a congestion control method. FIG. 1 is a flowchart of a congestion control method according to an embodiment of the present disclosure. As shown in FIG. 1, the method includes steps described below.

In step S102, it is determined whether a traffic data flow transmitted by base stations is congested.

In step S104, an Internet Protocol (IP) data packet in the traffic data flow is set when the traffic data flow transmitted by the base station is congested, where the set IP data packet is used for indicating that the traffic data flow transmitted by the base stations is congested.

In the above steps, it may be determined whether the traffic data flow carried by the base stations is congested and the IP data packet in the traffic data flow is set when the traffic data flow is determined to be congested to indicate that the traffic data flow is congested and thus different traffic data may be differentiated. Therefore, when a certain traffic data flow is congested and other traffic data flows are not congested, the transmitting end will not reduce a rate of a non-congested traffic data flow, thereby greatly reducing influence on user throughput and solving the problem in the existing art that the user throughput is affected because a base station only determines whether the base station is congested.

It is to be noted that the preceding step S102 may be embodied by determining whether a transmission rate of the traffic data flow satisfies a transmission rate requirement corresponding to a quality of service (QoS); where the traffic data flow is determined to be congested when the transmission rate requirement is not satisfied. Specifically, whether the transmission rate satisfies the transmission rate requirement corresponding to the QoS may be determined according to at least one of: channel information, transmission buffer occupation information, radio resource call information, or QoS information about the traffic.

In an embodiment of the present disclosure, before the preceding step S104, the method may further include: determining whether the base stations are allowed to set a congestion bit for the IP data packet in the traffic data flow. The IP data packet in the traffic data flow is set when the congestion bit is allowed to be set for the IP data packet in the traffic data flow. The IP data packet in the traffic data flow is set through: assigning a specified value to the congestion bit in the IP data packet. The congestion bit having the specified value is used for indicating that the traffic data flow transmitted by the base stations is congested.

It is to be noted that the congestion bit may, but may not necessarily, be an ECN; the specified value may, but may not necessarily, be 11.

It is to be noted that the method may be applied to at least one of the following scenarios: a terminal is connected to only one base station; or the terminal is connected to a plurality of base stations and the traffic data flow is carried on only one of the plurality of base stations.

It is to be noted that when the terminal is connected to only one base station, it is a single connection. In this case, the base station is allowed to set the congestion bit for the IP data packet in the traffic data flow. When the terminal is connected to the plurality of base stations, that is, in a multi-connection case, the traffic data flow is carried on only one base station and is shunted through a core network.

It is to be noted that in the multi-connection case, when the traffic data flow is carried on only one base station, the base station which carries the traffic data flow may be a primary base station or a secondary base station. The preceding steps S102 and S104 may be executed by the base station which carries the traffic data flow.

It is to be noted that the preceding steps may be executed by the primary base station or the secondary base station.

The traffic data flow may be traffic data flow shunted by the core network to the base station or traffic data flow shunted by the primary base station to the base station or an entire traffic data flow transmitted by the core network, but it is not limited thereto.

In an embodiment of the present disclosure, the preceding base stations may include the primary base station and a plurality of secondary base stations. In the case that the terminal is connected to the primary base station and the plurality of secondary base stations and the traffic data flow is shunted to the primary base station and the plurality of secondary base stations for transmission, before the preceding step S102, the method further includes at least one of steps described below. (i) A specified secondary base station among the plurality of secondary base stations determines whether the traffic data flow shunted to the specified secondary base station is congested, and informs the primary base station of a first message indicating that the traffic data flow shunted to the specified secondary base station is congested when the traffic data flow shunted to the specified secondary base station is congested. (ii) The primary base station determines whether the traffic data flow shunted to the primary base station is congested.

It is to be noted that the preceding step S102 may be embodied by the following step: when the primary base station receives the first message transmitted by the specified secondary base station and/or determines that the traffic data flow shunted to the primary base station is congested, the primary base station determines whether the entire traffic data flow is congested.

In an embodiment of the present disclosure, in the case that the terminal is connected to one primary base station and the plurality of secondary base stations and the traffic data flow is shunted to the primary base station and the plurality of secondary base stations for transmission, before the preceding step S102, the method further includes at least one of steps described below. (i) The specified secondary base station among the plurality of secondary base stations determines whether the specified secondary base station is congested, and informs the primary base station of a second message indicating that the specified secondary base station is congested when the specified secondary base station is congested. (ii) The primary base station determines whether the primary base station is congested.

It is to be noted that when the primary base station receives the second message and/or determines that the primary base station is congested, the primary base station determines whether the entire traffic data flow is congested.

It is to be noted that the step in which the base station determines whether the entire traffic data flow is congested may be embodied by the following steps: the primary base station determines whether the traffic data flow shunted to the specified secondary base station is capable of being shunted to the primary base station and the rest of the plurality of secondary base stations other than the specified secondary base station; when the traffic data flow shunted to the specified secondary base station is incapable of being shunted to the primary base station and the rest of the plurality of secondary base stations, the entire traffic data flow is determined to be congested; and/or the primary base station determines whether the traffic data flow shunted to the primary base station is capable of being shunted to the plurality of secondary base stations; when the traffic data flow shunted to the primary base station is incapable of being shunted to the plurality of secondary base stations, the entire traffic data flow is determined to be congested.

It is to be noted that the primary base station is allowed to set the congestion bit for the IP data packet in the traffic data flow, and the specified secondary base station and/or the rest of the plurality of secondary base stations are not allowed to set the congestion bit for the IP data packet in the traffic data flow.

It is to be noted that the above solution in the multi-connection case may solve the problem in the existing art that the user throughput is affected because congestion control is only applied to the single connection and the transmitting end reduces a rate of all paths of a user if a single path is congested.

From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the embodiments of the present disclosure substantially, or the part contributing to the existing art, may be embodied in the form of a computer software product. The computer software product is stored in a storage medium (such as a read-only memory (ROM)/random access memory (RAM), a magnetic disk or an optical disk) and includes several instructions for enabling a terminal apparatus (which may be a mobile phone, a computer, a server, a network apparatus, or the like) to execute the method according to each embodiment of the present disclosure.

Embodiment 2

This embodiment provides a congestion control device. The device is used for implementing the embodiments and optional embodiments described above. What has been described is not repeated herein. As used below, the term "module" may be software, hardware or a combination thereof capable of implementing predetermined functions. The device described below in the embodiments is implemented by software, but implementation by hardware or by a combination of software and hardware is also possible and conceived.

Figure 2:
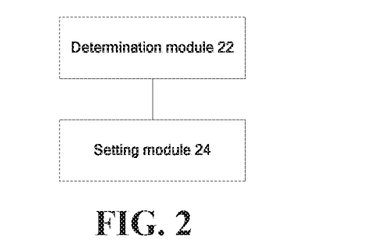
FIG. 2 is a block diagram of a congestion control device according to an embodiment of the present disclosure.

FIG. 2 is a block diagram of a congestion control device according to an embodiment of the present disclosure. As shown in FIG. 2, the device includes a determination module 22 and a setting module 24.

The determination module 22 is configured to determine whether a traffic data flow transmitted by base stations is congested.

The setting module 24 is connected to the determination module 22 and configured to set an Internet Protocol (IP) data packet in the traffic data flow when the determination module determines that the traffic data flow transmitted by the base stations is congested, where the set IP data packet is used for indicating that the traffic data flow transmitted by the base stations is congested.

In the above device, the determination module 22 may determine whether the traffic data flow carried by the base stations is congested and the setting module 24 sets the IP data packet in the traffic data flow when the traffic data flow is determined to be congested to indicate that the traffic data flow is congested and thus different traffic data may be differentiated. Therefore, when a certain traffic data flow is congested and other traffic data flows are not congested, the transmitting end will not reduce a rate of a non-congested traffic data flow, thereby greatly reducing influence on user throughput and solving the problem in the existing art that the user throughput is affected because a base station only determines whether the base station is congested.

It is to be noted that the determination module 22 may be further configured to determine whether a transmission rate of the traffic data flow satisfies a transmission rate requirement corresponding to a quality of service (QoS); where the traffic data flow is determined to be congested when the transmission rate requirement is not satisfied.

It is to be noted that the determination module 22 may be further configured to determine whether the transmission rate satisfies the transmission rate requirement according to at least one of: channel information, transmission buffer occupation information, radio resource call information, or QoS information about the traffic.

In an embodiment of the present disclosure, the determination module 22 may be further configured to determine whether the base stations are allowed to set a congestion bit for the IP data packet in the traffic data flow. The IP data packet in the traffic data flow is set when the congestion bit is allowed to be set for the IP data packet in the traffic data flow. The setting module is further configured to assign a specified value to the congestion bit in the IP data packet. The congestion bit having the specified value is used for indicating that the traffic data flow transmitted by the base station is congested.

It is to be noted that the congestion bit may, but may not necessarily, be an ECN; the specified value may, but may not necessarily, be 11.

It is to be noted that the device may be applied to one of the following scenarios: a terminal is connected to only one base station; or the terminal is connected to a plurality of base stations and the traffic data flow is carried on only one of the plurality of base stations.

In an embodiment of the present disclosure, the preceding base stations may include the primary base station and a plurality of secondary base stations. In the case that the terminal is connected to the primary base station and the plurality of secondary base stations and the traffic data flow is shunted to the primary base station and the plurality of secondary base stations for transmission, the determination module 22 may include at least one of a first determination unit or a second determination unit. The first determination unit is disposed in a specified secondary base station among the plurality of secondary base stations and configured to determine whether the traffic data flow shunted to the specified secondary base station is congested, and inform the primary base station of a first message indicating that the traffic data flow shunted to the specified secondary base station is congested when the traffic data flow shunted to the specified secondary base station is congested. The second determination unit is disposed in the primary base station and configured to determine whether the traffic data flow shunted to the primary base station is congested.

It is to be noted that when the primary base station receives the first message transmitted by the specified secondary base station and/or the second determination unit determines that the traffic data flow shunted to the primary base station is congested, the second determination unit may be further configured to determine whether an entire traffic data flow is congested.

It is to be noted that the second determination unit may be further configured to: determine whether the traffic data flow shunted to the specified secondary base station is capable of being shunted to the primary base station and the rest of the plurality of secondary base stations other than the specified secondary base station; where when the traffic data flow shunted to the specified secondary base station is incapable of being shunted to the primary base station and the rest of the plurality of secondary base stations, the entire traffic data flow is determined to be congested; and/or determine whether the traffic data flow shunted to the primary base station is capable of being shunted to the plurality of secondary base stations; where when the traffic data flow shunted to the primary base station is incapable of being shunted to the plurality of secondary base stations, the entire traffic data flow is determined to be congested.

In an embodiment of the present disclosure, the preceding base stations include the primary base station and the plurality of secondary base stations. When the terminal is connected to the primary base station and the plurality of secondary base stations and the traffic data flow is shunted to the primary base station and the plurality of secondary base stations for transmission, the determination module 22 may include at least one of a third determination unit or a fourth determination unit. The third determination unit is disposed in the specified secondary base station among the plurality of secondary base stations and configured to determine whether the specified secondary base station is congested, and inform the primary base station of a second message indicating that the specified secondary base station is congested when the specified secondary base station is congested. The fourth determination unit is disposed in the primary base station and configured to determine whether the primary base station is congested.

It is to be noted that the fourth determination unit may be further configured to determine, when the primary base station receives the second message and/or determines that the primary base station is congested, whether the entire traffic data flow is congested.

It is to be noted that the fourth determination unit may be further configured to: determine whether the traffic data flow shunted to the specified secondary base station is capable of being shunted to the primary base station and the rest of the plurality of secondary base stations other than the specified secondary base station; where when the traffic data flow shunted to the specified secondary base station is incapable of being shunted to the primary base station and the rest of the plurality of secondary base stations, the entire traffic data flow is determined to be congested; and/or determine whether the traffic data flow shunted to the primary base station is capable of being shunted to the plurality of secondary base stations; where when the traffic data flow shunted to the primary base station is incapable of being shunted to the plurality of secondary base stations, the entire traffic data flow is determined to be congested.

It is to be noted that the fourth determination unit and the second determination unit may be a same unit, and the third determination unit and the first determination unit may be a same unit, but it is not limited thereto.

It is to be noted that the primary base station is allowed to set the congestion bit for the IP data packet in the traffic data flow, and the specified secondary base station and/or the rest of the plurality of secondary base stations are not allowed to set the congestion bit for the IP data packet in the traffic data flow.

It is to be noted that the preceding device further solves the problem in the existing art that congestion control is only applied to a single connection and the user throughput is affected because the transmitting end reduces a rate of all paths of a user if a single path is congested.

It is to be noted that the traffic data flow may be one of: traffic data flow shunted by a core network to the base stations, traffic data flow shunted by the primary base station to the base stations, or the entire traffic data flow transmitted by the core network.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 3

Figure 3:
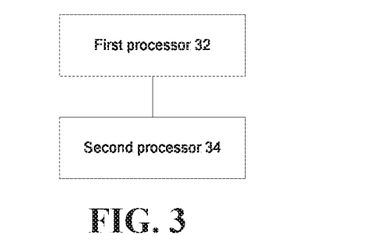
FIG. 3 is a structural diagram of a base station according to an embodiment of the present disclosure.

The embodiments of the present disclosure further provide a base station. FIG. 3 is a block diagram of a base station according to an embodiment of the present disclosure. As shown in FIG. 3, the base station includes a first processor 32 and a second processor 34.

The first processor 32 is configured to determine whether a traffic data flow transmitted by the base station is congested.

The second processor 34 is configured to set an Internet Protocol (IP) data packet in the traffic data flow when the first processor determines that the traffic data flow transmitted by the base station is congested, where the set IP data packet is used for indicating that the traffic data flow transmitted by the base station is congested.

In the above base station, it may be determined whether the traffic data flow carried by the base station is congested and the IP data packet in the traffic data flow is set when the traffic data flow is determined to be congested to indicate that the traffic data flow is congested and thus different traffic data may be differentiated. Therefore, when a certain traffic data flow is congested and other traffic data flows are not congested, the transmitting end will not reduce a rate of a non-congested traffic data flow, thereby greatly reducing influence on user throughput and solving the problem in the existing art that the user throughput is affected because a base station only determines whether the base station is congested.

It is to be noted that the first processor 32 may be further configured to determine whether a transmission rate of the traffic data flow satisfies a transmission rate requirement corresponding to a quality of service (QoS); where the traffic data flow is determined to be congested when the transmission rate requirement is not satisfied.

It is to be noted that the first processor 32 may be further configured to determine whether the transmission rate satisfies the transmission rate requirement according to at least one of: channel information, transmission buffer occupation information, radio resource call information, or QoS information about the traffic.

In an embodiment of the present disclosure, the first processor 32 may be further configured to determine whether the base station is allowed to set a congestion bit for the IP data packet in the traffic data flow. The second processor is further configured to set the IP data packet in the traffic data flow when the first processor determines that the congestion bit is allowed to be set for the IP data packet in the traffic data flow. The second processor 34 may be further configured to assign a specified value to the congestion bit in the IP data packet. The congestion bit having the specified value is used for indicating that the traffic data flow transmitted by the base station is congested.

It is to be noted that a terminal is only connected to the base station; or the terminal is connected to a plurality of base stations and the traffic data flow is only carried the base station. The base station is one of the plurality of base stations.

The embodiments of the present disclosure further provide a system. The system includes a primary base station. The primary base station is configured to determine whether an entire traffic data flow is congested, and set an Internet protocol (IP) data packet in the traffic data flow when the entire traffic data flow is congested, where the set IP data packet is used for indicating that the traffic data flow transmitted by a base station is congested.

In an embodiment of the present disclosure, a first secondary base station among a plurality of secondary base stations may be configured to determine whether the traffic data flow shunted to the first secondary base station is congested, and inform the primary base station of a first message indicating that the traffic data flow shunted to the first secondary base station is congested when the traffic data flow shunted to the first secondary base station is congested. The primary base station may be further configured to: determine whether the traffic data flow shunted to the first secondary base station is capable of being shunted to the primary base station and the rest of the plurality of secondary base stations other than the first secondary base station after receiving the first message; and determine that the entire traffic data flow is congested when the traffic data flow shunted to the first secondary base station is incapable of being shunted to the primary base station and the rest of the plurality of secondary base stations. It is to be noted that the primary base station may be further configured to determine whether the traffic data flow shunted to the primary base station is congested, and when the traffic data flow shunted to the primary base station is congested, determine whether the traffic data flow shunted to the primary base station is capable of being shunted to the plurality of secondary base stations. When the traffic data flow shunted to the primary base station is incapable of being shunted to the plurality of secondary base stations, the entire traffic data flow is determined to be congested by the primary base station.

In an embodiment of the present disclosure, a second secondary base station among the plurality of secondary base stations may be configured to determine whether the second secondary base station is congested, and inform the primary base station of a second message indicating that the second secondary base station is congested when the second secondary base station is congested. The primary base station may be further configured to determine whether the traffic data flow shunted to the second secondary base station is capable of being shunted to the primary base station and the rest of the plurality of secondary base stations other than the second secondary base station. When the traffic data flow shunted to the second secondary base station is incapable of being shunted to the primary base station and the rest of the plurality of secondary base stations, the entire traffic data flow is determined to be congested by the primary base station.

It is to be noted that the primary base station may be further configured to determine whether the primary base station is congested, and when the primary base station is congested, determine whether the traffic data flow shunted to the primary base station is capable of being shunted to the plurality of secondary base stations. When the traffic data flow shunted to the primary base station is incapable of being shunted to the plurality of secondary base stations, the entire traffic data flow is determined to be congested by the primary base station.

It is to be noted that the primary base station is allowed to set the congestion bit for the IP data packet in the traffic data flow, and a specified secondary base station and/or the rest of the plurality of secondary base stations are not allowed to set the congestion bit for the IP data packet in the traffic data flow.

It is to be noted that the preceding system further solves the problem in the existing art that congestion control is only applied to a single connection and the user throughput is affected because the transmitting end reduces a rate of all paths of a user if a single path is congested.

Embodiment 4

The embodiments of the present disclosure further provide a computer-readable storage medium. Optionally, in this embodiment, the storage medium may be configured to store computer-executable instructions or program codes for executing the method in the embodiment 1.

Optionally, in this embodiment, the storage medium described above may include, but is not limited to, a USB flash disk, a read-only memory (ROM), a random access memory (RAM), a mobile hard disk, a magnetic disk, an optical disk or another medium capable of storing program codes.

Optionally, in this embodiment, a processor executes the steps of the method in the embodiment 1 according to the program codes stored in the storage medium.

Optionally, for specific examples in this embodiment, reference may be made to the examples described in the preceding embodiments and optional embodiments, and repetition will not be made in this embodiment.

To better understand the present disclosure, the present disclosure will be further described below in conjunction with optional embodiments.

Figure 4:
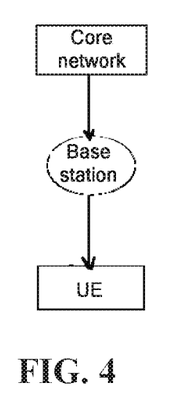
FIG. 4 is a schematic diagram illustrating architecture in a single connection case according to an optional embodiment of the present disclosure.

The present disclosure provides an optional embodiment. The optional embodiment of the present disclosure includes a provision for setting an ECN congestion bit for an IP data packet transmitted by a base station. The optional embodiment of the present disclosure stipulates that the base station sets the ECN congestion bit for user traffic data with a specific QoS carried on the base station. For example, for the ECN congestion bit set for certain data radio bearer (DRB) traffic, only when the base station detects that a certain DRB data flow carried by the base station is congested (or a transmission resource is limited) and thus the QoS cannot be satisfied, can the base station set the ECN congestion bit in an IP data message of the DRB traffic of the user. In a related solution, the ECN is set by the base station according to whether the whole base station is congested, which is disadvantageous for accurate QoS control of single traffic. An optional embodiment of the present disclosure further includes a method and device for determining whether the base station is allowed to set an ECN congestion flag for an IP data packet in a certain user traffic data flow (such as a certain DRB) carried by the base station. After the user and the base station have newly established or reconfigured a traffic bearer, the base station may determine whether the certain DRB of the user is shunted to a plurality of base stations (split bearer). When the DRB is established on a single base station, the base station is allowed to set the ECN congestion bit for IP data of the DRB. When the DRB is established on the plurality of base stations, that is, the DRB traffic is carried by split bearers, if the base station is an anchored primary base station, the base station is allowed to set the ECN congestion bit for the IP data packet of the DRB; if the base station is a secondary base station, the base station is not allowed to set the ECN congestion bit for the IP data packet of the DRB. An optional embodiment of the present disclosure further includes a method and steps for the base station to perform congestion control in a data transmission process. After the traffic bearer has been established or reconfigured, the base station determines whether the traffic data (DRB) bearer configuration of the base station its self allows the ECN congestion bit to be set for the IP data packet of the DRB based on the determination method in the preceding technical solution. FIG. 4 is a schematic diagram illustrating architecture in a single connection case according to an optional embodiment of the present disclosure. As shown in FIG. 4, according to channel/transmission buffer occupation/radio resource scheduling information, user DRB QoS information about the traffic and the like, the base station determines whether a transmission rate of the user traffic data can satisfy a requirement of the QoS and thus determines whether the DRB is congested. If the DRB is determined to be non-congested, the data is directly transmitted. When the base station determines that the DRB is congested, if the IP data packet in the DRB has been identified as ECN=01 or ECN=10 (ECN=01/10 indicates that the ECN is supported and ECN=00 indicates that the ECN is not supported), the ECN in the IP data packet is modified to ECN=11, indicating that the DRB data flow transmitted by the current base station is congested.

Figure 5:
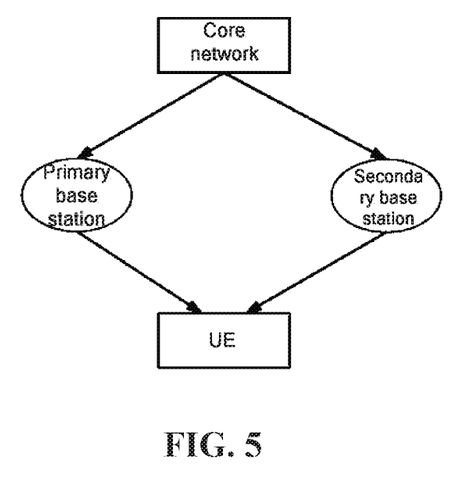
FIG. 5 is a schematic diagram illustrating architecture in which a traffic data flow is shunted by a core network according to an optional embodiment of the present disclosure.

In a multi-connection case, the base station determines whether the DRB is established on a plurality of base stations. If the DRB traffic is only carried on the base station its self and is not shunted to another base station (in this case, the DRB traffic is shunted by a core network (CN)), reference may be made to alternative 1A architecture in the multi-connection defined in the existing 3GPP. FIG. 5 is a schematic diagram illustrating architecture in which a traffic data flow is shunted by a core network according to an optional embodiment of the present disclosure. As shown in FIG. 5, in this architecture, downlink user plane data of the secondary base station comes from the core network, but bearer management on its control plane, including shunt decisions and control, is performed in a master evolved node B (MeNB) rather than a mobility management entity (MME) of the primary base station. If the DRB traffic is only carried on the base station its self and is not shunted to another base station, the base station determines, according to the channel/transmission buffer occupation/radio resource scheduling information, the user DRB QoS information about the traffic and the like, whether the transmission rate of the user traffic data can satisfy the requirement of the QoS and thus determines whether the DRB is congested. If the DRB is determined to be non-congested, the data is directly transmitted. When the base station determines that the DRB is congested, if the IP data packet in the DRB has been identified as ECN=01 or ECN=10 (ECN=01/10 indicates that the ECN is supported and ECN=00 indicates that the ECN is not supported), the ECN in the IP data packet is modified to ECN=11, indicating that the DRB data flow transmitted by the current base station is congested.

Figure 6:
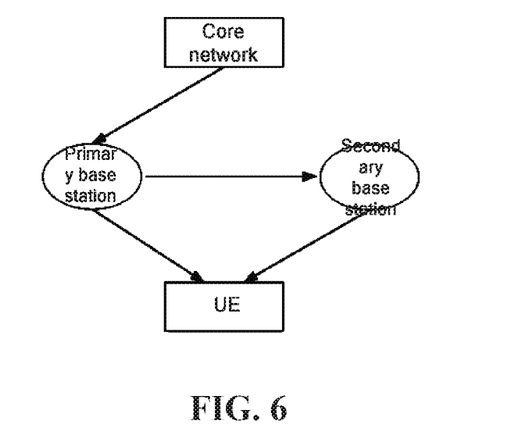
FIG. 6 is a schematic diagram illustrating architecture in which a traffic data flow is shunted by a base station in a multi-connection case according to an optional embodiment of the present disclosure.

In the multi-connection case, the base station determines whether the DRB is established on a plurality of base stations. If the DRB traffic is shunted by the plurality of base stations for transmission, (in this case, the DRB traffic is shunted by the base station in the multi-connection), reference may be made to alternative 3C architecture in the multi-connection defined in the existing 3GPP. FIG. 6 is a schematic diagram illustrating architecture in which a traffic data flow is shunted by a base station in a multi-connection case according to an optional embodiment of the present disclosure. As shown in FIG. 6, in this architecture, a same downlink user plane DRB data flow of the primary base station is shunted to the plurality of base stations for transmission through an inter-base station interface such as an Xn interface. In this case, the secondary base station and the primary base station exchange transmission capability information, and the primary base station forwards DRB data to the secondary base station through an interface between the primary base station and the secondary base station, such as the Xn interface, according to the transmitted data and an existing transmission capability of the secondary base station. When the secondary base station detects that the secondary base station itself has a limited transmission capacity and cannot transmit the data forwarded by the primary base station in time, the base station needs to exchange the transmission capability information with the primary base station and inform the primary base station that the secondary base station itself is congested because the secondary base station cannot set the ECN congestion bit for the DRB data according to the determination method in the preceding technical solution. The primary base station determines, according to transmission capabilities of the primary base station and the other base stations, whether the data flow can be shunted to the primary base station and the other base stations for transmission. If so, more data is shunted to the other base stations; if not, and the IP data packet of the DRB has been identified as ECN=01 or ECN=10 (ECN=01/10 indicates that the ECN is supported, and ECN=00 indicates that the ECN is not supported), the ECN bit at the header of the IP data packet in the DRB data flow transmitted or forwarded by the primary base station is modified to ECN=11, indicating that the DRB data flow transmitted by the current base station is congested.

With the methods described in the optional embodiments of the present disclosure, more refined QoS control may be performed on the congestion control of the user's RB traffic in the 3GPP network to prevent unnecessary rate reduction of some user traffic by a transmitting end because the base station side sets the congestion bit only for a congested node. In addition, the present disclosure may solve the problem that the existing ECN mechanism is not applicable to the multi-connection architecture and avoid the ECN congestion control triggered by a single congested base station in the multi-connection case which causes the transmitting end to reduce the transmission rate of all transmission paths. The present disclosure may effectively improve user throughput and network throughput.

Optional Embodiment 1

Figure 7:
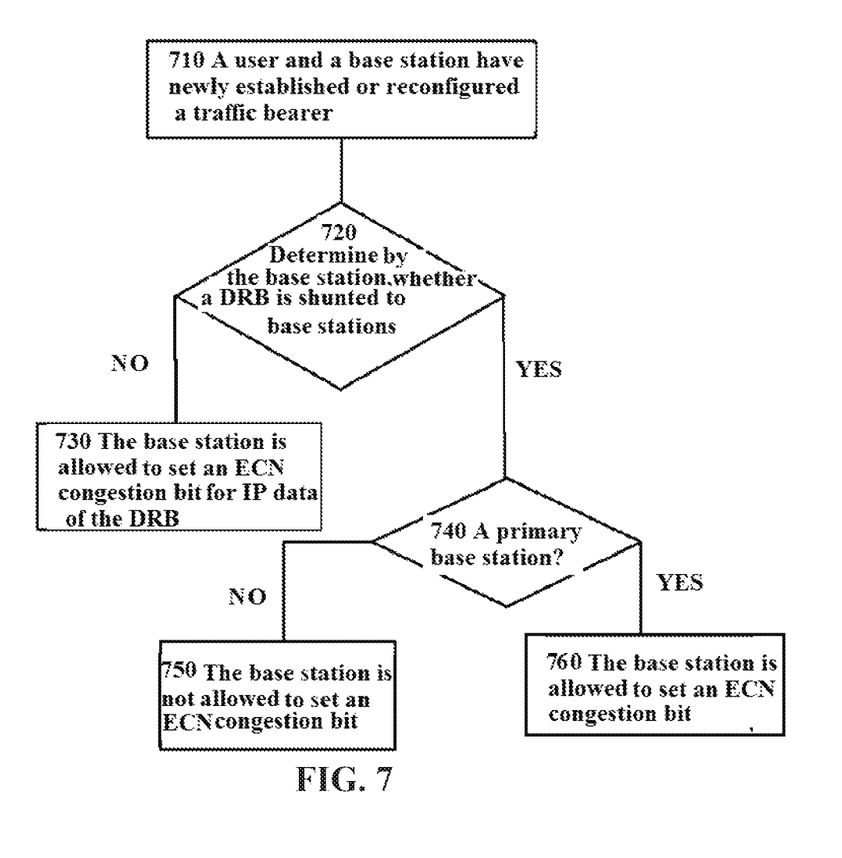
FIG. 7 is a flowchart of a method used by a base station for determining whether the base station is allowed to set an ECN congestion bit for an IP data flow in a transmitted DRB according to an optional embodiment of the present disclosure.

FIG. 7 is a flowchart of a method used by a base station for determining whether the base station is allowed to set an ECN congestion bit for an IP data flow in a transmitted DRB according to an optional embodiment of the present disclosure. As shown in FIG. 7, the method includes steps described below.

In step 710, currently a user and a base station have newly established or reconfigured a user plane traffic bearer, DRB.

In step 720, the base station may determine whether a certain DRB of the user is shunted to a plurality of base stations (whether it is a split bearer).

In step 730, when the DRB is established on a single base station, the base station is allowed to set an ECN congestion bit for IP data of the DRB.

In step 740, if the DRB is established on the plurality of base stations, that is, the DRB traffic is the split bearer, it is determined whether the base station is a primary base station or a secondary base station in a multi-connection case.

In step 750, if the base station is the secondary base station, the base station is not allowed to set the ECN congestion bit for an IP data packet of the DRB.

In step 760, if the base station is an anchored primary base station, the base station is allowed to set the ECN congestion bit for the IP data packet of the DRB.

Optional Embodiment 2

Figure 8:
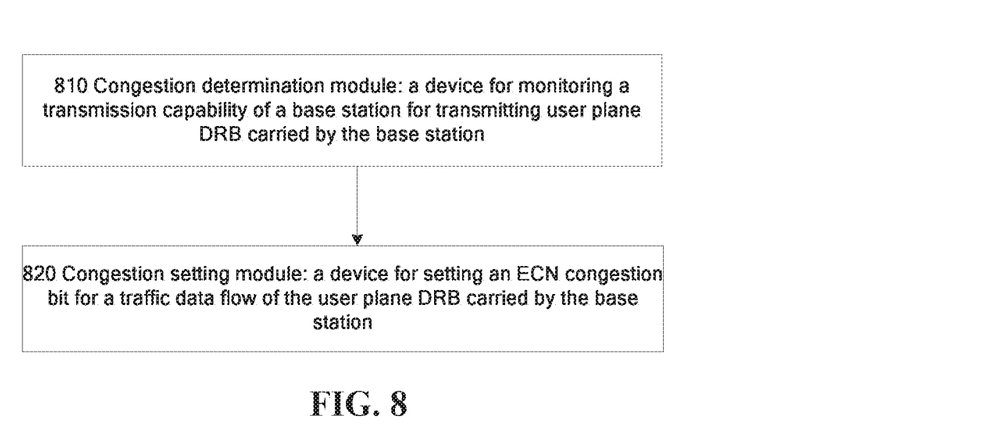
FIG. 8 is a schematic diagram of a device for setting an ECN congestion bit on a base station side according to an optional embodiment of the present disclosure.

FIG. 8 is a schematic diagram of a device for setting an ECN congestion bit on a base station side according to an optional embodiment of the present disclosure. The device includes a congestion determination module and an ECN congestion bit setting module, which will be described in detail in conjunction with FIG. 8.

The congestion determination module 810 (equivalent to the preceding determination module 22) determines, according to channel/transmission buffer occupation/radio resource scheduling information, user DRB QoS information about the traffic and the like, whether a transmission rate of user traffic data can satisfy a QoS requirement and thus determines whether a DRB is congested. A significant difference between a congestion determination scheme in the optional embodiment of the present disclosure and a related scheme is that the scheme in this embodiment is to determine whether a certain traffic data flow with a particular QoS carried by a base station is congested, and the related scheme is to determine whether an air interface of the whole base station is congested.

When it is determined that the DRB is congested and the base station is allowed to set a congestion bit for the DRB, if an IP data packet in the DRB has been identified as ECN=01 or ECN=10 (ECN=01/10 indicates that ECN is supported and ECN=00 indicates that the ECN is not supported), the ECN congestion bit setting module 820 (equivalent to the preceding setting module 24) modifies an IP header to ECN=11, indicating that a DRB data flow transmitted by the current base station is congested. The significant difference between the congestion determination scheme in the present disclosure and the related scheme is that in this scheme, an ECN bit is set for an IP data flow in the certain traffic data flow with the particular QoS carried by the base station, and in the related scheme, the ECN bit is set for an IP data flow transmitted by the whole base station without differentiating users and user traffic bearers.

Optional Embodiment 3

Figure 9:
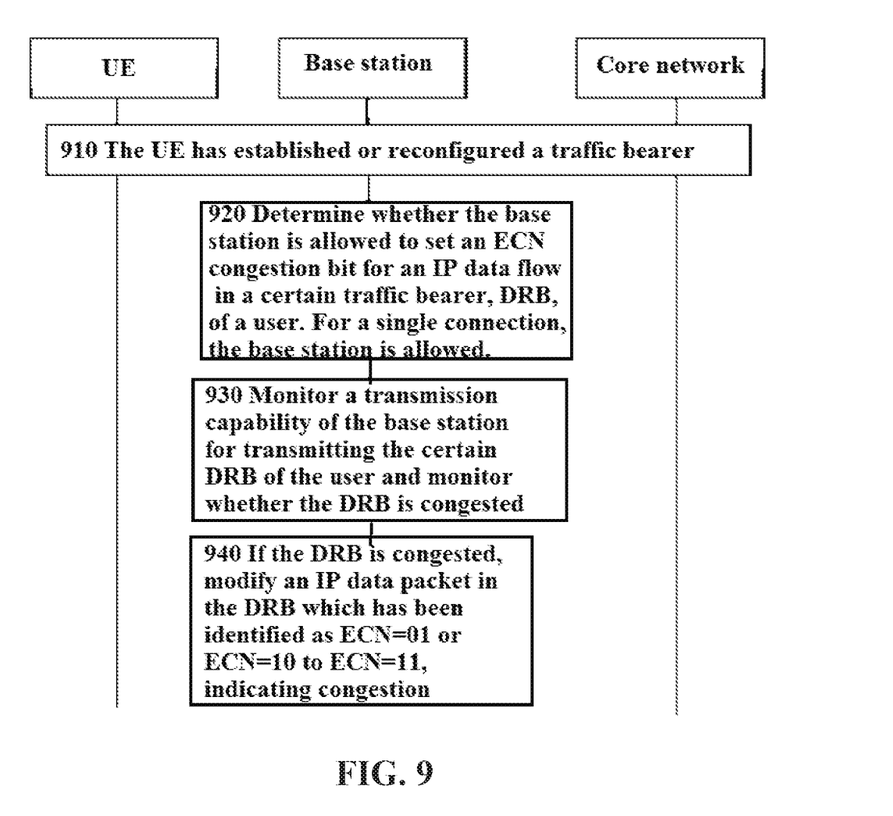
FIG. 9 is a schematic diagram of a congestion control process in single connection transmission according to an optional embodiment of the present disclosure.

FIG. 9 is a schematic diagram of a congestion control process in single connection transmission according to an optional embodiment of the present disclosure. The process is described below in detail in conjunction with FIG. 9.

In step 910, currently a user and a base station have newly established or reconfigured a user plane traffic bearer, DRB. In this step, the user is connected to a single base station.

In step 920, it is determined whether the base station is allowed to set an ECN congestion bit for an IP data flow of a certain traffic bearer, the DRB of the user. Since the user is connected to the single base station, the base station is allowed to set the ECN congestion bit for the IP data flow in the DRB of the user.

In step 930, the base station determines, according to channel/transmission buffer occupation/radio resource scheduling information, user DRB QoS information about the traffic and the like, whether a transmission rate of user traffic data can satisfy a QoS requirement and thus determines whether the DRB is congested.

In step 940, if the base station determines that the DRB is congested and an IP data packet in the DRB has been identified as ECN=01 or ECN=10 (ECN=01/10 indicates that ECN is supported and ECN=00 indicates that the ECN is not supported), an IP data header is modified to ECN=11, indicating that a DRB data flow transmitted by the current base station is congested.

Optional Embodiment 4

Figure 10:
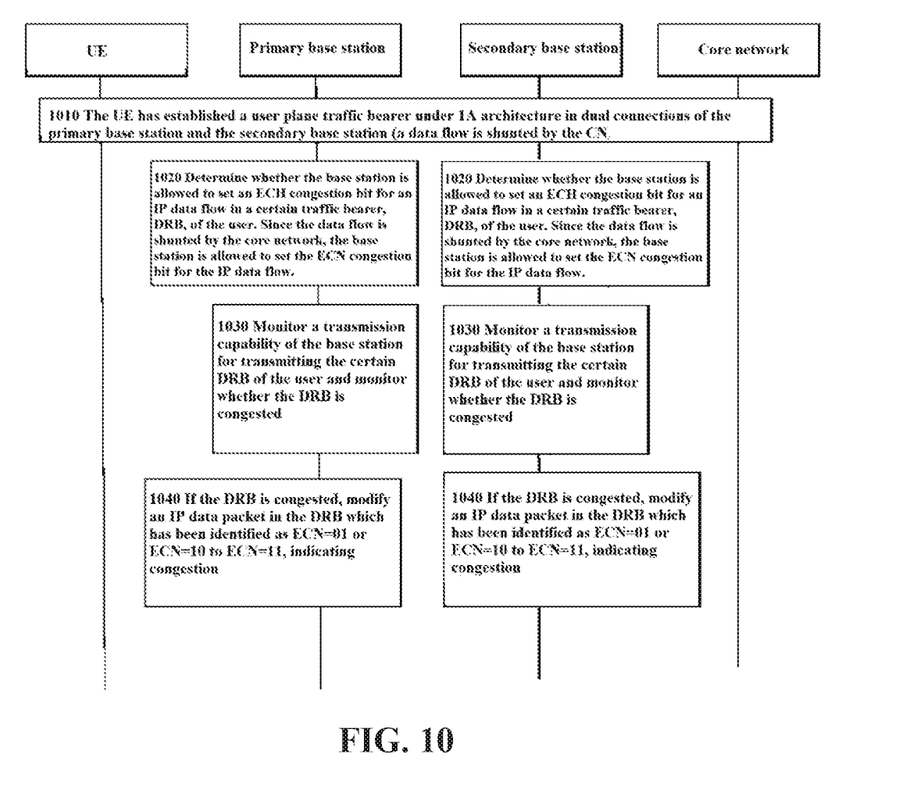
FIG. 10 is a schematic diagram of a congestion control process in dual connection transmission (when a traffic data flow is shunted by a CN) under architecture 1A in the present disclosure.

FIG. 10 is a schematic diagram of a congestion control process in dual connection transmission (when a traffic data flow is shunted by a CN) under architecture 1A in the present disclosure. It is to be noted that though this embodiment is described by taking existing dual connection architecture as an example, this embodiment is also applicable to a future multi-connection case, which belongs to the scope of the present disclosure. The process is described below in detail in conjunction with FIG. 10.

In step 1010, currently a user and base stations have newly established or reconfigured a user plane traffic bearer, DRB. In this step, the user is connected to dual base stations, and a user plane data flow is shunted by the CN.

In step 1020, it is determined whether a base station is allowed to set an ECN congestion bit for an IP data flow of a certain traffic bearer, the DRB of the user. Since user plane data of the user is shunted by the core network and the core network directly sends data to the primary base station and the secondary base station, the primary base station and the secondary base station have similar operations and are allowed to set an ECN for the DRB of the user carried on the base station.

In step 1030, the base station determines, according to channel/transmission buffer occupation/radio resource scheduling information, user DRB QoS information about the traffic and the like, whether a transmission rate of user traffic data can satisfy a QoS requirement and thus determines whether the DRB is congested.

In step 1040, if the base station determines that the DRB is congested and an IP data packet in the DRB has been identified as ECN=01 or ECN=10 (ECN=01/10 indicates that the ECN is supported and ECN=00 indicates that the ECN is not supported), an IP data header is modified to ECN=11, indicating that a DRB data flow transmitted by the current base station is congested.

Optional Embodiment 5

Figure 11:
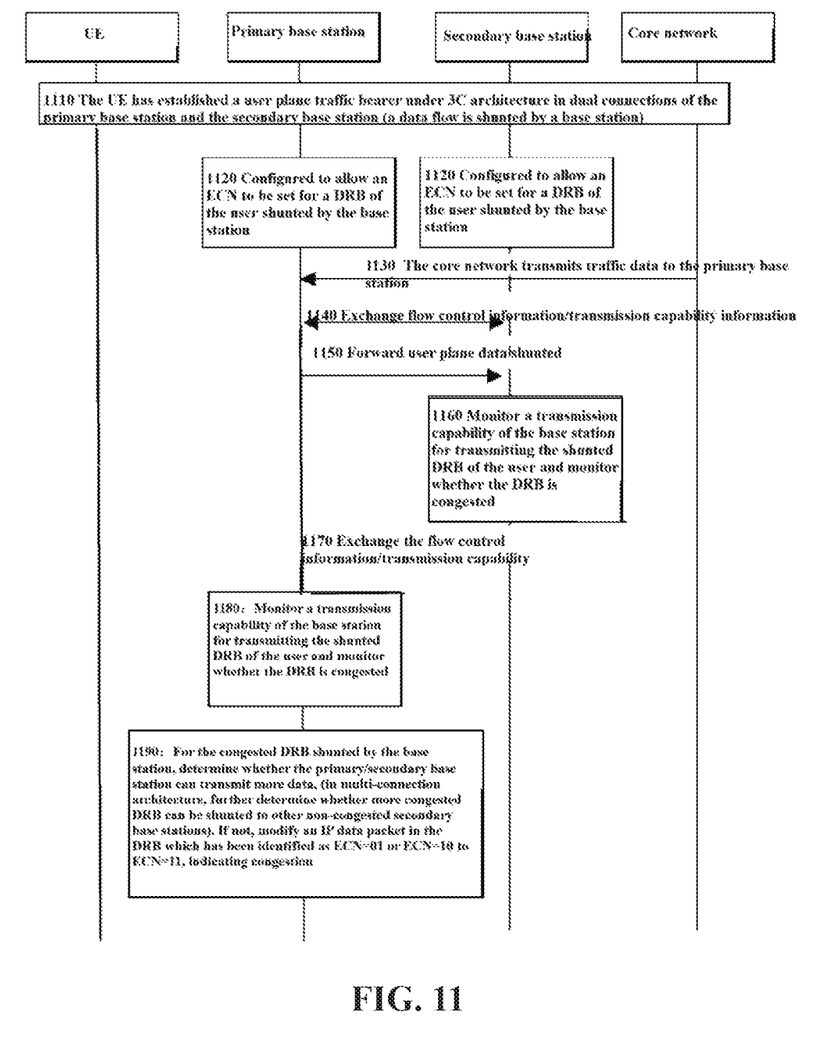
FIG. 11 is a schematic diagram of a congestion control process in dual connection transmission (when a traffic data flow is shunted by a base station) under architecture 3C in the present disclosure.

FIG. 11 is a schematic diagram of a congestion control process in dual connection transmission (when a traffic data flow is shunted by a base station) under architecture 3C in the present disclosure. It is to be noted that though this embodiment is described by taking existing dual connection architecture as an example, this embodiment is also applicable to a future multi-connection case, which belongs to the scope of the present disclosure. The process is described below in detail in conjunction with FIG. 11.

In step 1110, currently a user and base stations have newly established or reconfigured a user plane traffic bearer, DRB. In this step, the user is connected to dual base stations, and a user plane data flow is shunted by the base stations.

In step 1120, a primary base station is allowed to set an ECN congestion bit for a shunted DRB of the user. In this step, a secondary base station is not allowed to set the ECN congestion bit for the shunted DRB of the user.

In step 1130, a core network transmits traffic data to the primary base station.

In step 1140, the primary base station and the secondary base station exchange flow control information and transmission capability information to implement a flow control function. In this step, the primary base station may know how much data can be shunted to the secondary base station for transmission.

In step 1150, according to a flow control result in step 1140, the primary base station forwards a corresponding amount of shunted data to the secondary base station.

In step 1160, the secondary base station determines, according to channel/transmission buffer occupation/radio resource scheduling information, a data transmission result and the like, whether the secondary base station can transmit the shunted data in time and thus determines whether the DRB is congested at the secondary base station.

In step 1170, if the secondary base station determines that the shunted DRB is congested at the secondary base station in step 1160, the secondary base station informs the primary base station in the flow control process.

In step 1180, the primary base station determines, according to the channel/transmission buffer occupation/radio resource scheduling information of the primary base station and flow control information exchanges with the secondary base station, monitors whether the DRB shunted to the primary base station and the secondary base station is congested.

In step 1190, if the primary base station determines that the shunted DRB of the user is congested in step 1180, the primary base station determines whether the primary/secondary base station has an existing capability of transmitting more data for the congested DRB, (in multi-connection architecture, it is further determined whether more congested DRB can be shunted to other non-congested secondary base stations). If not, an IP data packet in the DRB which has been identified as ECN=01 or ECN=10 is modified to ECN=11, indicating congestion.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation.

The above are only optional embodiments of the present disclosure and are not intended to limit the present disclosure, and for those skilled in the art, the present disclosure may have various modifications and variations.

INDUSTRIAL APPLICABILITY

Based on the embodiments of the present disclosure, it may be determined whether the traffic data flow carried by the base station is congested and the IP data packet in the traffic data flow is set when the traffic data flow is determined to be congested to indicate that the traffic data flow is congested and thus different traffic data may be differentiated. Therefore, when a certain traffic data flow is congested and other traffic data flows are not congested, the transmitting end will not reduce a rate of a non-congested traffic data flow, thereby greatly reducing the influence on user throughput and solving the problem in the existing art that the user throughput is affected because a base station only determines whether the base station is congested.

What is claimed is:

1. A congestion control method, comprising:
   determining whether a traffic data flow of a plurality of traffic data flows being transmitted by base stations is congested; and
   setting an Internet Protocol (IP) data packet in only the traffic data flow which is congested and not in the other traffic data flows that are not congested,
   wherein the set IP data packet is used for indicating that the traffic data flow of a plurality of traffic data flows being transmitted by the base stations is congested;
   wherein the base stations comprise: a primary base station and a plurality of secondary base stations;
   wherein a terminal is connected to the primary base station and the plurality of secondary base stations and the traffic data flow is shunted to the primary base station and the plurality of secondary base stations for transmission; and
   wherein the primary base station is allowed to set a congestion bit for the IP data packet in the traffic data flow, and a specified secondary base station and/or a rest of the plurality of secondary base stations are not allowed to set the congestion bit for the IP data packet in the traffic data flow.

2. The method of claim 1, wherein before the setting an Internet Protocol (IP) data packet in the traffic data flow, the method further comprises: determining whether the base stations are allowed to set a congestion bit for the IP data packet in the traffic data flow, wherein the IP data packet in the traffic data flow is set when the base stations are allowed to set the congestion bit for the IP data packet in the traffic data flow; and
   wherein the setting an Internet Protocol (IP) data packet in the traffic data flow comprises: assigning a specified value to the congestion bit in the IP data packet, wherein the congestion bit having the specified value is used for indicating that the traffic data flow transmitted by the base stations is congested.

3. The method of claim 1, wherein before the determining whether a traffic data flow of a plurality of traffic data flows being transmitted by base stations is congested, the method further comprises at least one of:
   (i) determining, by a first secondary base station among the plurality of secondary base stations, whether the traffic data flow shunted to the first secondary base station is congested, and informing the primary base station of a first message indicating that the traffic data flow shunted to the first secondary base station is congested when the traffic data flow shunted to the first secondary base station is congested; and
   (ii) determining, by the primary base station, whether the traffic data flow shunted to the primary base station is congested,
   wherein the determining whether a traffic data flow of a plurality of traffic data flows being transmitted by base stations is congested comprises:
   when the primary base station receives the first message transmitted by the first secondary base station and/or when the primary base station determines that the traffic data flow shunted to the primary base station is congested, determining, by the primary base station, whether an entire traffic data flow is congested.

4. The method of claim 1, wherein before the determining whether a traffic data flow of a plurality of traffic data flows being transmitted by base stations is congested, the method further comprises at least one of:
(i) determining, by a second secondary base station among the plurality of secondary base stations, whether the second secondary base station is congested, and informing the primary base station of a second message indicating that the second secondary base station is congested when the second secondary base station is congested; and
(ii) determining, by the primary base station, whether the primary base station is congested,
wherein the determining whether a traffic data flow of a plurality of traffic data flows being transmitted by base stations is congested comprises:
when the primary base station receives the second message and/or when the primary base station determines that the primary base station is congested, determining, by the primary base station, whether an entire traffic data flow is congested.

5. The method of claim 3, wherein the determining, by the primary base station, whether an entire traffic data flow is congested comprises:
determining, by the primary base station, whether the traffic data flow shunted to the first secondary base station is capable of being shunted to the primary base station and a rest of the plurality of secondary base stations other than the first secondary base station, wherein when the traffic data flow shunted to the first secondary base station is incapable of being shunted to the primary base station and the rest of the plurality of secondary base stations other than the first secondary base station, the entire traffic data flow is determined to be congested; and/or
determining, by the primary base station, whether the traffic data flow shunted to the primary base station is capable of being shunted to the plurality of secondary base stations, wherein when the traffic data flow shunted to the primary base station is incapable of being shunted to the plurality of secondary base stations, the entire traffic data flow is determined to be congested.

6. A congestion control device, comprising a processor and a storage device for storing computer executable instructions, wherein the instructions comprise a determination module and a setting module, when the instructions are executed by the processor, the processor performs functions of the determination module and the setting module to implement the method of claim 1;
the determination module is configured to determine whether a traffic data flow of a plurality of traffic data flows being transmitted by base stations is congested; and
the setting module is configured to set an Internet Protocol (IP) data packet in only the traffic data flow which is congested and not in the other traffic data flows that are not congested, wherein the set IP data packet is used for indicating that the traffic data flow of a plurality of traffic data flows being transmitted by the base stations is congested;
wherein the base stations comprise: a primary base station and a plurality of secondary base stations;
wherein a terminal is connected to the primary base station and the plurality of secondary base stations and the traffic data flow is shunted to the primary base station and the plurality of secondary base stations for transmission; and
wherein the primary base station is allowed to set a congestion bit for the IP data packet in the traffic data flow, and a specified secondary base station and/or a rest of the plurality of secondary base stations are not allowed to set the congestion bit for the IP data packet in the traffic data flow.

7. The device of claim 6, wherein the determination module is further configured to determine whether the base stations are allowed to set a congestion bit for the IP data packet in the traffic data flow, wherein the IP data packet in the traffic data flow is set when the base stations are allowed to set the congestion bit for the IP data packet in the traffic data flow; and
the setting module is further configured to assign a specified value to the congestion bit in the IP data packet, wherein the congestion bit having the specified value is used for indicating that the traffic data flow transmitted by the base stations is congested.

8. The device of claim 6, wherein the determination module comprises at least one of:
a first determination unit, disposed in a first secondary base station among the plurality of secondary base stations and configured to determine whether the traffic data flow shunted to the first secondary base station is congested, and inform the primary base station of a first message indicating that the traffic data flow shunted to the first secondary base station is congested when the traffic data flow shunted to the first secondary base station is congested; and
a second determination unit, disposed in the primary base station and configured to determine whether the traffic data flow shunted to the primary base station is congested.

9. The device of claim 8, wherein when the primary base station receives the first message transmitted by the first secondary base station and/or when the second determination unit determines that the traffic data flow shunted to the primary base station is congested, the second determination unit is further configured to determine whether an entire traffic data flow is congested,
wherein the second determination unit is further configured to:
determine whether the traffic data flow shunted to the first secondary base station is capable of being shunted to the primary base station and a rest of the plurality of secondary base stations other than the first secondary base station, wherein when the traffic data flow shunted to the first secondary base station is incapable of being shunted to the primary base station and a rest of the plurality of secondary base stations other than the first secondary base station, the entire traffic data flow is determined to be congested; and/or
determine whether the traffic data flow shunted to the primary base station is capable of being shunted to the plurality of secondary base stations, wherein when the traffic data flow shunted to the primary base station is incapable of being shunted to the plurality of secondary base stations, the entire traffic data flow is determined to be congested.

10. The device of claim 8, wherein the determination module comprises at least one of:
a third determination unit, disposed in the first secondary base station among the plurality of secondary base stations and configured to determine whether the first secondary base station is congested, and inform the primary base station of a second message indicating that the first secondary base station is congested when the first secondary base station is congested; and a fourth determination unit, disposed in the primary base station and configured to determine whether the primary base station is congested.

11. The device of claim 10, wherein the fourth determination unit is further configured to determine, when the primary base station receives the second message and/or determines that the primary base station is congested, whether an entire traffic data flow is congested, wherein the fourth determination unit is further configured to:
determine whether the traffic data flow shunted to the first secondary base station is capable of being shunted to the primary base station and a rest of the plurality of secondary base stations other than the first secondary base station, wherein when the traffic data flow shunted to the first secondary base station is incapable of being shunted to the primary base station and the rest of the plurality of secondary base stations other than the first secondary base station, the entire traffic data flow is determined to be congested; and/or
determine whether the traffic data flow shunted to the primary base station is capable of being shunted to the plurality of secondary base stations, wherein when the traffic data flow shunted to the primary base station is incapable of being shunted to the plurality of secondary base stations, the entire traffic data flow is determined to be congested.

12. A system, comprising:
a primary base station and a plurality of secondary base stations, wherein a terminal is connected to the primary base station and the plurality of secondary base stations, and a traffic data flow is shunted to the primary base station and the plurality of secondary base stations for transmission;
wherein the primary base station is configured to determine whether an entire traffic data flow of a plurality of traffic data flows is congested, and set an Internet protocol (IP) data packet in only the traffic data flow of a plurality of traffic data flows and not in the other traffic data flows that are not congested when the entire traffic data flow of a plurality of traffic data flows is congested;
wherein the set IP data packet is used for indicating that the traffic data flow of a plurality of traffic data flows being transmitted by the primary base station and the plurality of secondary base stations is congested; and
wherein the primary base station is allowed to set a congestion bit for the IP data packet in the traffic data flow, and a specified secondary base station and/or a rest of the plurality of secondary base stations are not allowed to set the congestion bit for the IP data packet in the traffic data flow.

13. The system of claim 12, wherein
a first secondary base station among the plurality of secondary base stations is configured to determine whether the traffic data flow shunted to the first secondary base station is congested, and inform the primary base station of a first message indicating that the traffic data flow shunted to the first secondary base station is congested when the traffic data flow shunted to the first secondary base station is congested; and
the primary base station is further configured to:

determine, after receiving the first message, whether the traffic data flow shunted to the first secondary base station is capable of being shunted to the primary base station and a rest of the plurality of secondary base stations other than the first secondary base station, wherein when the traffic data flow shunted to the first secondary base station is incapable of being shunted to the primary base station and the rest of the plurality of secondary base stations other than the first secondary base station, the entire traffic data flow is determined to be congested by the primary base station; or determine whether the traffic data flow shunted to the primary base station is congested, and when the traffic data flow shunted to the primary base station is congested, determine whether the traffic data flow shunted to the primary base station is capable of being shunted to the plurality of secondary base stations; wherein when the traffic data flow shunted to the primary base station is incapable of being shunted to the plurality of secondary base stations, the entire traffic data flow is determined to be congested by the primary base station.

14. The system of claim 12, wherein
a second secondary base station among the plurality of secondary base stations is configured to determine whether the second secondary base station is congested, and inform the primary base station of a second message indicating that the second secondary base station is congested when the second secondary base station is congested; and
the primary base station is further configured to:
determine whether the traffic data flow shunted to the second secondary base station is capable of being shunted to the primary base station and a rest of the plurality of secondary base stations other than the second secondary base station, wherein when the traffic data flow shunted to the second secondary base station is incapable of being shunted to the primary base station and the rest of the plurality of secondary base stations other than the second secondary base station, the entire traffic data flow is determined to be congested by the primary base station; or
determine whether the primary base station is congested, and when the primary base station is congested, determine whether the traffic data flow shunted to the primary base station is capable of being shunted to the plurality of secondary base stations; wherein when the traffic data flow shunted to the primary base station is incapable of being shunted to the plurality of secondary base stations, the entire traffic data flow is determined to be congested by the primary base station.

15. The method of claim 1, wherein the determining whether a traffic data flow of a plurality of traffic data flows being transmitted by base stations is congested comprises:
determining whether a transmission rate of the traffic data flow satisfies a transmission rate requirement corresponding to a quality of service (QOS) according to at least one of: channel information, transmission buffer occupation information, radio resource call information, or QoS information about the traffic, wherein the traffic data flow is determined to be congested when the transmission rate requirement is not satisfied.

16. The device of claim 6, wherein the determination module is further configured to determine whether a transmission rate of the traffic data flow satisfies a transmission rate requirement corresponding to a quality of service (QoS) according to at least one of: channel information, transmission buffer occupation information, radio resource call information, or QoS information about the traffic, wherein the traffic data flow is determined to be congested when the transmission rate requirement is not satisfied.

\* \* \* \* \*